United States Patent [19]
Fukasawa

[11] Patent Number: 6,072,512
[45] Date of Patent: Jun. 6, 2000

[54] ELECTROPHOTOGRAPHIC PRINTING APPARATUS WITH CONTROLLER FOR VARYING LIGHT INTENSITY

[75] Inventor: Hisashi Fukasawa, Niigata, Japan

[73] Assignee: NEC Corporation, Tokyo, Japan

[21] Appl. No.: 09/066,593

[22] Filed: Apr. 27, 1998

[30] Foreign Application Priority Data

Apr. 28, 1997 [JP] Japan ............................. 9-111582

[51] Int. Cl.$^7$ .......................... B41J 2/385; G03G 15/043
[52] U.S. Cl. ............................................. 347/131; 399/51
[58] Field of Search ................................ 399/47, 48, 46, 399/51; 347/131

[56] References Cited

U.S. PATENT DOCUMENTS

| | | | |
|---|---|---|---|
| 4,816,863 | 3/1989 | Lee ............................................. | 399/51 |
| 5,038,298 | 8/1991 | Matsumoto et al. ..................... | 364/518 |
| 5,194,878 | 3/1993 | Murakami et al. ................. | 358/296 X |
| 5,303,006 | 4/1994 | Mizude ..................................... | 399/46 |
| 5,311,215 | 5/1994 | Hattori et al. ....................... | 358/501 X |
| 5,349,421 | 9/1994 | Kishimoto et al. ...................... | 399/46 |
| 5,485,191 | 1/1996 | Gu ....................................... | 358/298 X |
| 5,565,995 | 10/1996 | Yamada et al. ........................ | 358/298 |
| 5,696,604 | 12/1997 | Curry ..................................... | 358/459 |
| 5,734,947 | 3/1998 | Tanabe .................................... | 399/45 |
| 5,737,008 | 4/1998 | Kobayashi et al. ................. | 358/298 X |
| 5,745,262 | 4/1998 | Tatsumi ............................... | 358/475 X |
| 5,841,956 | 11/1998 | Venkateswar et al. ............. | 358/298 X |

FOREIGN PATENT DOCUMENTS

| | | |
|---|---|---|
| 61-201059 | 12/1986 | Japan . |
| 62-47662 | 3/1987 | Japan . |
| 63-85765 | 4/1988 | Japan . |
| 1-95070 | 4/1989 | Japan . |
| 2-156257 | 6/1990 | Japan . |
| 3-161773 | 7/1991 | Japan . |
| 4-201271 | 7/1992 | Japan . |
| 5-150602 | 6/1993 | Japan . |
| 6-161195 | 6/1994 | Japan . |

*Primary Examiner*—William J. Royer
*Attorney, Agent, or Firm*—Sughrue, Mion, Zinn, Macpeak & Seas, PLLC

[57] ABSTRACT

An electrophotographic printing device using a light source for emitting predetermined light and a photosensitive material on which an electrostatic latent image is formed by the light from the light source. The electrophotographic printing device has a memory for storing density control information on light intensity of the light source and density of an image formed on a printing medium, and a light intensity controller for controlling the light intensity of the light source based on the information in the memory. The density control information stored in the memory is determined from a relationship between the density of the image to be formed and potential of the electrostatic latent image, and a relationship between the potential of the electrostatic latent image and the light source.

9 Claims, 4 Drawing Sheets

# ELECTROPHOTOGRAPHIC PRINTING APPARATUS WITH CONTROLLER FOR VARYING LIGHT INTENSITY

BACKGROUND OF THE INVENTION

1. Field of the Invention

The present invention relates to an electrophotographic printing apparatus, and, more particularly, to an electrophotographic printing apparatus suitable for a printer using an electrophotographic process.

2. Description of the Prior Art

It has been known that, when it is intended for a conventional electrophotographic printing apparatus such a printer to change image density of an image to be printed, there are approaches to change the bias voltage for a developing roller in a developing section, or to vary amount of toner being used for development (first conventional example).

On the other hand, for example, Japanese Patent Application Laid-Open No. 62-47662 discloses an electrophotographic non-impact printer capable of two-color printing with the following arrangement (second conventional example). The printer employs an approach for varying density of characters or the like to be printed on a medium by controlling a driving current for a semiconductor laser through an operation panel provided external to the printer. This is because the semiconductor laser has a fixed relationship between its light intensity and image density. More specifically, this approach adjusts a variable resistor of the operation panel to vary the light intensity of semiconductor laser. The variation of light intensity causes variation of a potential on a photosensitive material, thereby finally changing the density of printing.

A third conventional example is disclosed in Japanese Patent Application Laid-Open No. 5-150602. It detects amount of bias voltage applied to a developing magnetic brush, intensity of light emitted from a light source and image density, normalizes them with a fuzzy inference processor, and controls the light source and the bias voltage of the printer based on that result.

As described for the first example, the conventional electrophotographic printing apparatus varies the bias voltage for the photosensitive material in order to vary the density of image. However, when the bias voltage is varied, there arises such a problem that so-called fog effect occurs on the printing medium, or that the printing medium tends to be blemished because the toner density is significantly varied.

In addition, the non-impact printer according to the second example has an operation panel therein for varying density of an image. Thus, if the printer is installed at a location remote from a computer, it is necessary for the operator to come to the site where the printer is installed every time he/she wants to change printing density, which is very inconvenient. Here, change of printing density means an action performed by changing the light intensity of semiconductor laser, rather than change of image density through image processing which is typically performed by a printer driver.

Furthermore, there arises a problem in a case where a computer is connected to a printer through a network, and, more particularly, where one printer is connected to a plurality of computers. If a user who operated the printer just before another user once changes light intensity of semiconductor laser through the operation panel, the light intensity of semiconductor laser is changed on a hardware level, so that the second user becomes impossible to perform printing under the previous setting. Thus, if the second operator performs printing as is without knowing the fact that the light intensity of semiconductor laser has been changed, he/she cannot obtain print quality under image density which he/she intends.

SUMMARY OF THE INVENTION

The present invention is made in view of the above circumstances, and is intended to provide an electrophotographic printing apparatus which performs printing under desired image density of a user by changing intensity of light emitted from a light source to accommodate the desired image density.

To attain the above object, the present invention employs an electrophotographic printing apparatus as follows. The electrophotographic printing apparatus of the present invention comprises a light source for emitting predetermined light, a photosensitive material on which an electrostatic latent image is formed by the light from the light source, a memory for storing information on light intensity of the light source and density of an image formed on a printing medium, and a light intensity controller for controlling the light intensity of the light source from the information in the memory. Then, the density control information to be stored in the memory is determined from a relationship between the density of the image to be formed and potential of the electrostatic latent image, and a relationship between the potential of the electrostatic latent image and the light intensity of the light source.

In the electrophotographic printing apparatus arranged as above, when intended image density is set in the electrophotographic printing apparatus through an operation panel or the like, image density information is taken out from the memory on the predetermined relationship between the light intensity of the light source and the image density on the recording medium. Then, the controller varies the light intensity of the light source based on the image density information so that it accommodates the desired image density. This enables it to very easily obtain intended image density only by setting the image density through the operation panel.

Furthermore, even when one printer is connected to a plurality of computers through a network, each user can obtain image density suitable for him/her by setting his/her desired image density on the electrophotographic printing apparatus through operation means of his/her computer, whereby he/she does not suffer from unintended image density, and can obtain an image with high quality without fail. It is particularly suitable for a gray scale image such as a mesh image, and small reverse-white characters than for a character image or solid black image.

DETAILED DESCRIPTION OF THE PREFERRED EMBODIMENTS

Figure 1:
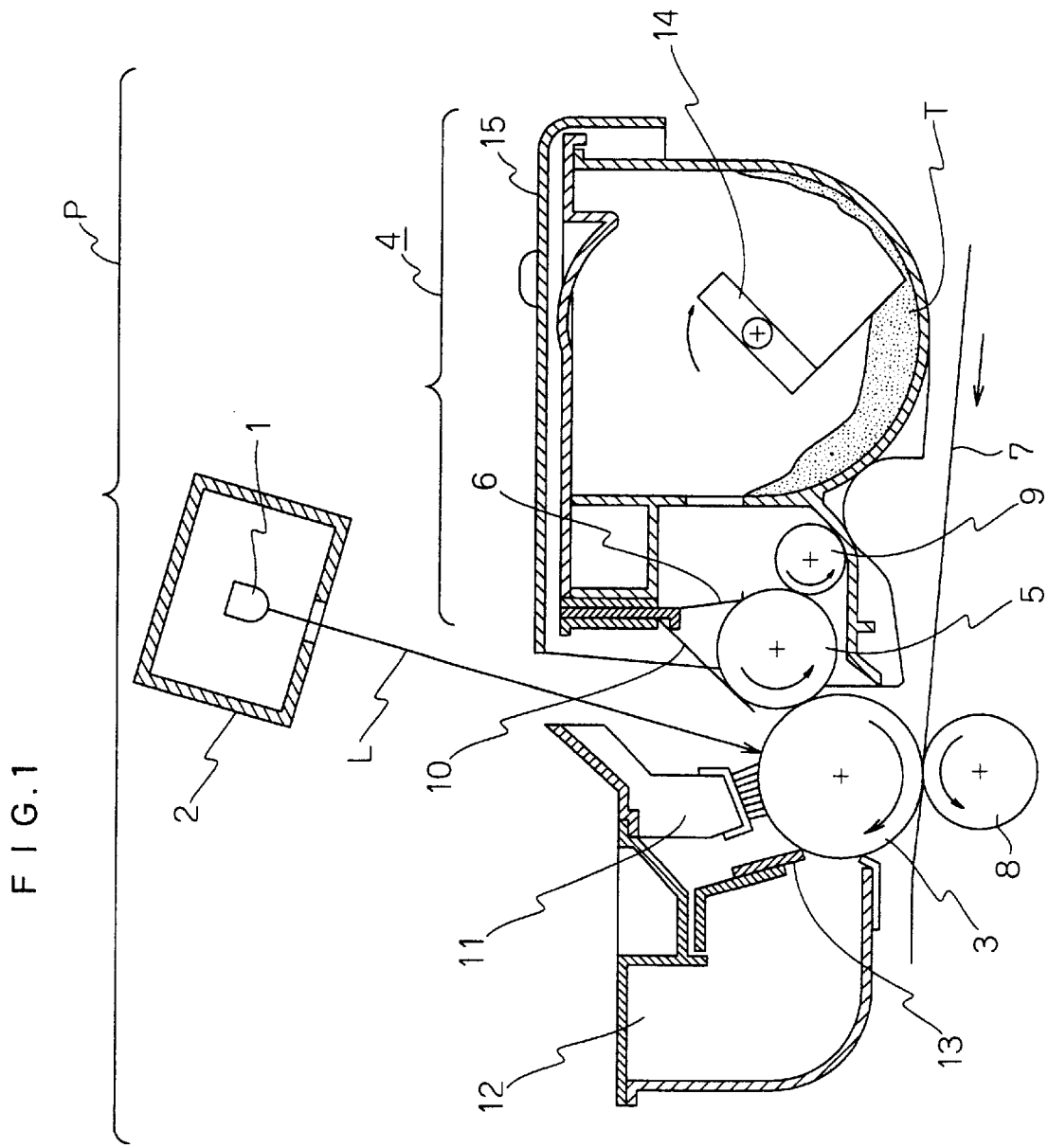
FIG. 1 is a sectional view showing an electrophotographic printing apparatus of an embodiment according to the present invention.

Now, an embodiment of an electrophotographic printing apparatus P according to the present invention will be described with reference to the attached drawings. Referring to FIG. 1, there is shown in a sectional view of an electrophotographic printing apparatus P of the embodiment according to the present invention (hereinafter called an "electrophotographic printer"). In the figure, there are shown a semiconductor laser 1 emitting a laser beam (emitting light) L, and an optical unit containing the semiconductor laser 1 therein. There is also shown a photosensitive material 3 which has an image carrier such as an organic photoconductor (OPC) on its surface, and on which an electrostatic latent image is formed by a laser beam L from the semiconductor laser 1. There is provided a developer 4 comprising a developing roller 5 contacting the photosensitive material 3 through toner T, and a first regulating blade 6 contacting the developing roller 5. The developer 4 forms a toner image on the photosensitive material 3. It utilizes non-magnetic one-component contact development process.

The electrophotographic printer further comprises a transfer roller 8 located opposite to the photosensitive material 3 through a printing medium 7 and for transferring the toner image to the printing medium 7, a supply roller 9 adjacent to the developing roller 5, a second regulating blade 10 contacting the developing roller 5, a charging brush 11 contacting the photosensitive material 3, a cleaner 12, a cleaning blade 13 contacting the photosensitive material 3, a mixer 14, and an EP cartridge 15.

Here, although the toner T is described for a case where the reversal development process is employed when it is non-magnetic and charged with negative charge, it should be understood that the embodiment encompasses all cases of the toner T charged with positive charge and the normal development process because only difference is to use the opposite polarity.

A material constituting the developing roller 5 may include silicon rubber, urethane rubber, nitrirylbutylene rubber, natural rubber, or a surface treated foamed elastic material such as sponge. Other suitable materials include flexible conductive materials on the surface of which nylon rubber or urethane rubber is applied.

The first and second regulating blades 6 and 10 are made of a flexible material. More specific materials to be used may include urethane rubber, silicon rubber, polyethylene terephthalate (PET) film, and a metal leaf spring such as stainless steel.

The transfer roller 8 is a flexible and conductive roller-shaped member. More specific material may include a foamed member of a material such as silicon, urethane, EPDM (ethylene-propylene rubber diene monomer). The charging brush 11 consists of a brush-shaped conductive member of rayon or acrylic, or a roller-shaped conductive member.

Figure 2:
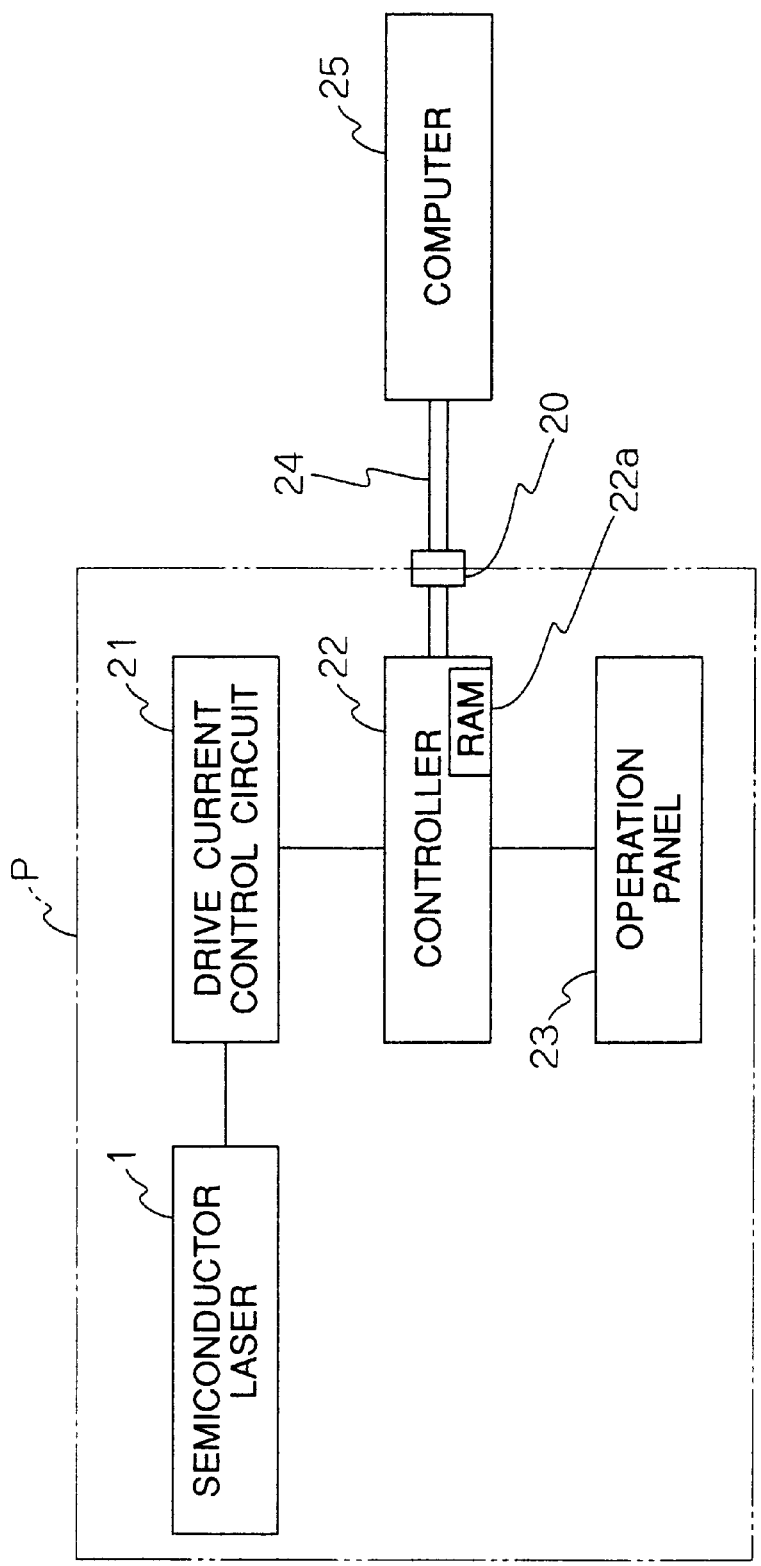
FIG. 2 is a block diagram showing an arrangement for changing light intensity of a semiconductor laser in the electrophotographic printing apparatus according to the present invention.

Then, as shown in FIG. 2, the semiconductor laser 1 is connected to a controller 22 through a drive current control circuit 21 which controls a drive current for the semiconductor laser 1. The controller 22 is then connected to an operation panel 23 for enabling a user to set his/her desired image density, and to a computer 25 through a connecting terminal 20 and a printer cable 24.

The controller 22 varies light intensity from the semiconductor laser 1 to accommodate to desired image density based on a relationship between the light intensity from the semiconductor laser 1 and image density on the printing medium 7. That is, the controller 22 contains therein a storage device 22a such as a memory which records a relationship between intensity of light emitted from the semiconductor laser 1 and image density when an image is printed on the printing medium 7. Therefore, the controller 22 controls the intensity of the semiconductor laser 1 through the drive current control circuit 21 based on the information recorded in the storage means 22a and control information specified by the user through the operation panel 23. Here, the computer 25 connected to the controller 22 contains therein a print control program called a printer driver so that it can control the image density as with the operation panel 23 of the electrophotographic printer.

Figure 3:
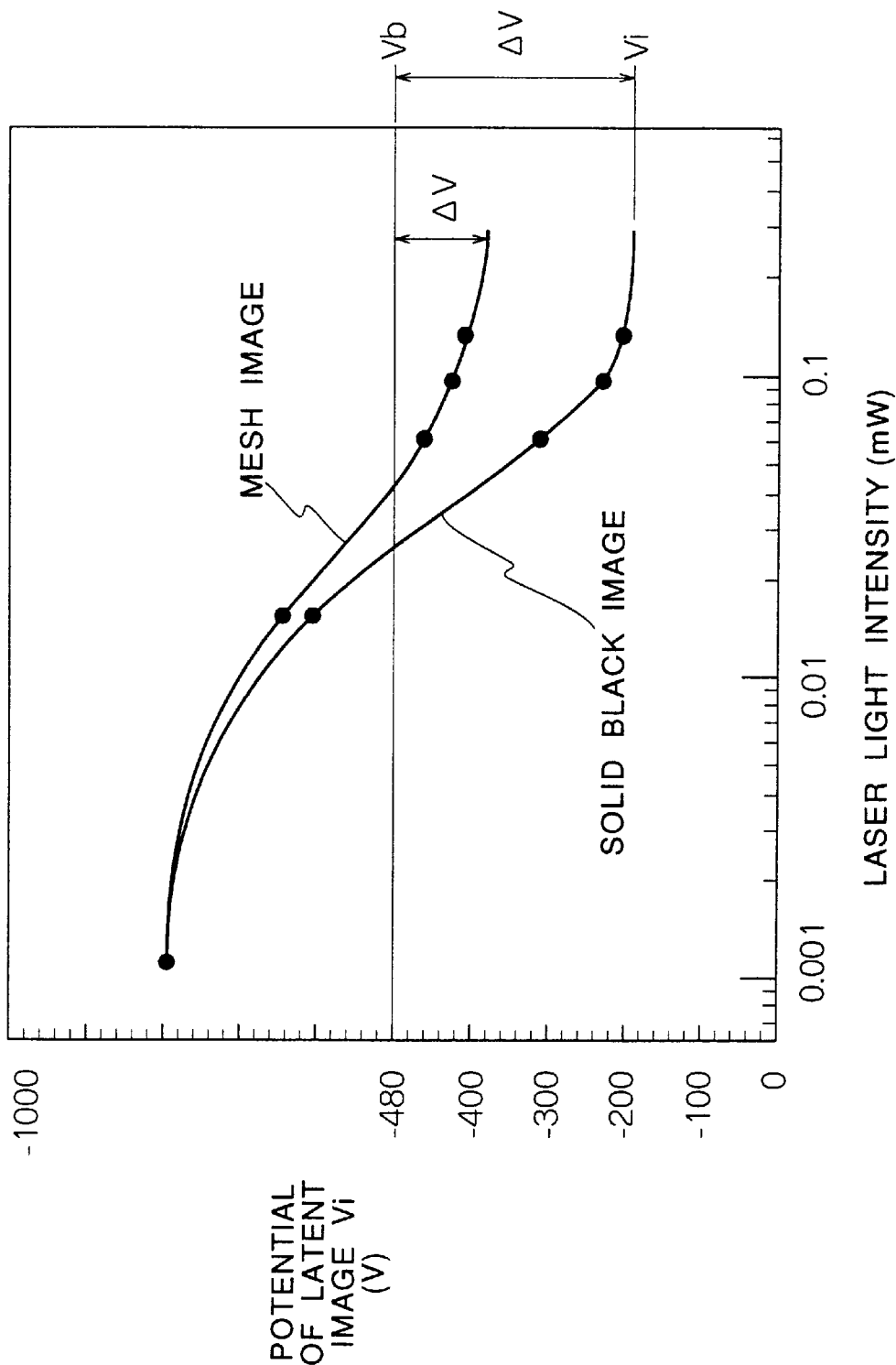
FIG. 3 is a graph showing a relationship between potential on an electrostatic latent image section of a photosensitive material and light intensity of the semiconductor laser.

Now, description is given on the relationship between the light intensity and the image density recorded in the storage means 22a. FIG. 3 shows a relationship between potential on the photosensitive material 3 and light intensity from the semiconductor laser 1. Here, called a bright portion potential Vi is potential on a portion which is illuminated by the laser beam L, and on which an electrostatic latent image is formed. Image density of an image to be printed on the printing medium 7 depends on a gap potential $\Delta V$. The gap potential $\Delta V$ is the difference between the bright portion potential Vi and a bias potential Vb on the developing roller 5. More specifically, the higher gap potential $\Delta V$ provides thicker image density. For example, when bias potential Vb=−480 V is assumed as a first example, quantity of laser light L of 0.12 mW provides Vi=−210 V and the gap potential $\Delta V$=−270 V. As a second example, for quantity of laser light L of 0.09 mW, Vi=−240 V and the gap potential $\Delta V$=−240 V.

It has been also empirically found that the bright portion potential Vi varies depending on an image pattern of an electrostatic latent image formed on the photosensitive material 3. For example, when solid pattern (filled-in pattern) is printed for the quantity of laser beam L of 0.12 mW, Vi=−210 V. On the other hand, when a mesh pattern is printed, the value of Vi closes to the development bias voltage Vb depending on printing density, so that the gap potential $\Delta V$ is reduced.

In a condition of laser light intensity is 0.1 mW, the bright portion potential Vi is saturated in a case of black solid image printing. But in a case of mesh image printing, the bright portion potential Vi is not saturated.

Figure 4:
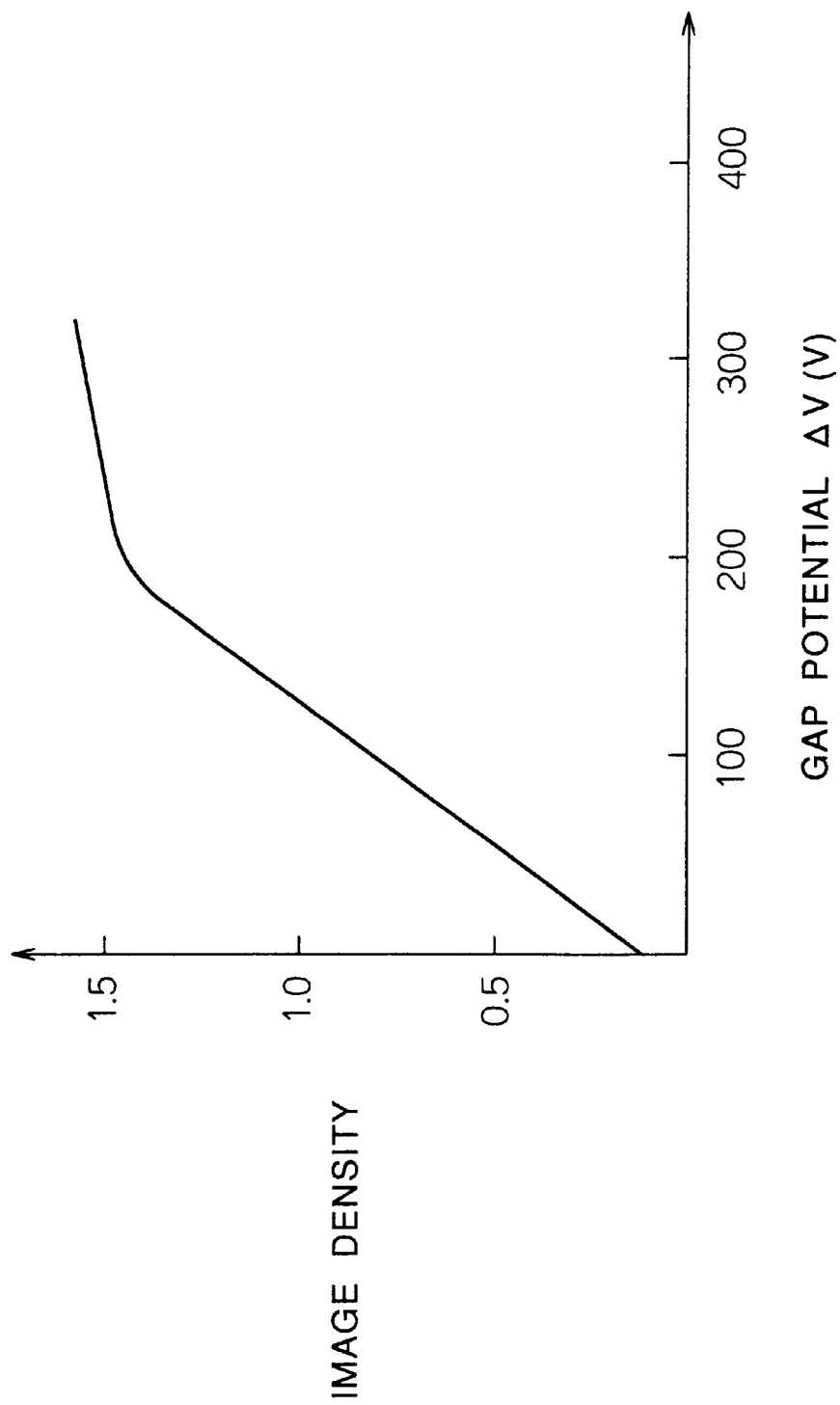
FIG. 4 is a graph showing a relationship between gap potential $\Delta V$ and image density.

FIG. 4 shows a relationship between the gap potential $\Delta V$ and image density of an image formed on the printing medium 7. Here, the gap potential $\Delta V$ is substantially proportional to the image density until the gap potential $\Delta V$ closes to 200 V. On the other hand, it is shown, once the gap potential $\Delta V$ exceeds 200 V, the variation of image density becomes small. In FIG. 4, higher image density is indicated at a higher point on the axis of ordinates.

As described above, the gap potential $\Delta V$ is determined from the light intensity of the laser beam L and the potential on the electrostatic latent image portion of the photosensitive material 3 as shown in FIG. 3. Then, FIG. 4 determines the relationship between the gap potential $\Delta V$ and the image density. By using these relationships, it is possible to know a relationship between the light intensity of the laser beam L and the image density through the gap potential $\Delta V$. Then the resultant relationship between the light intensity of the laser beam L and the image density is recorded in the storage means 22a. Once the relationship between the light intensity of the laser beam L and the image density becomes known, it becomes possible to positively vary the image density by varying the light intensity of the laser beam L.

Now, there is described in detail the operation and effects of the electrophotographic printer. First, the image density is changed by a print control program called a printer driver with the computer 25 connected to the electrophotographic printer. When change of the image density is instructed, the information on image density enters into the controller 22 for controlling print data through the printer cable 24. The controller 22 reads light intensity information of the laser beam L from the storage means 22a. The light intensity information corresponds to the image density data. The information on light intensity of the laser beam L thus read is transmitted to the drive current control circuit 21. The drive current control circuit 21 applies a drive current corresponding to the image density to the semiconductor laser 1. This enables it to obtain the intended quantity of laser beam L. Change of the image density is not limited to a command from the computer 25, but may be effected through the operation panel 23 of the electrophotographic printer.

Here, change of printing density means an action performed by changing the light intensity of semiconductor laser, rather than change of image density through image processing which is typically performed by a printer driver. However, the present invention can support change of density through the image processing. That is, the present invention features to attain change of image density by changing the light intensity of the light source on the hardware level, in addition to change of image density using image processing on software, which has been utilized.

Since the photosensitive material 3 illuminated by the laser beam L in the above process is previously charged with uniform charges by the charging brush 11, it is illuminated with desired light intensity as the semiconductor laser 1 illuminates laser beam L. Then, an electrostatic latent image is formed on the photosensitive material 3. Subsequently, a toner image is formed on the photosensitive material 3 by the developer 4, and transferred to the printing medium 7 by the transfer roller 8.

As described above, according to the electrophotographic printing apparatus p (electrophotographic printer) of the embodiment, image density can be varied by changing light intensity of the semiconductor laser 1 so that it corresponds to desired image density based on the relationship between the light intensity of the semiconductor laser 1 and the image density on the printing medium 7. Thus, the desired image density can be obtained only by changing the image density with either the computer 25 or the operation panel 23, which is a very simple operation.

Even when one electrophotographic printer is connected to a plurality of computers 25 through a network, each user can obtain respective desired image density by individually setting image density each user wishes to have with the computer 25. This eliminates a possibility that printing is performed in image density against one's intention, whereby each use can obtain a high quality image without any defect. It is more effective in a case of a gray scale image such as a mesh image, and small reverse-white characters than an image mainly consisting of characters or solid black (filled-in) image.

As described above, the electrophotographic printing apparatus according to the first aspect of the present invention comprises a memory for storing a relationship between predetermined the light intensity of emitting light and image density on the printing medium, an operation panel for setting a desired image density, and a controller for varying light intensity of the emitting light to accommodate to the desired image density based on the relationship between the light intensity and the image density, so that the desired image density can be obtained only by setting the image density with the setting means, which is a very simple operation.

In addition, even when the computers and the printers are connected in a one-to-many relationship, respectively, through a network, because each user can individually set image he/she wishes to have, each user can individually obtain their desired image density, thereby eliminating the possibility of having an image density against his/her intention, and being able to obtain a high quality image without any defect. Particularly, it is most effective in a case of a gray scale image such as a mesh image, and small reverse-white characters than an image mainly consisting of characters or solid black image.

In addition, it is arranged that the relationship between the light intensity and the image density is determined from the relationship between the potential on the electrostatic latent image section of the photosensitive material and light intensity of the emitting light, and the relationship between the potential on the electrostatic latent image section of the photosensitive material and the image density on the recording material. Thus, a desired image density can be obtained only by setting an image density through the operation panel.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-111582 (Filed on Apr. 28, 1997) including specification, claims, drawings and summary are incorporated herein by reference in its entirety.

What is claimed is:

1. An electrophotographic printing apparatus comprising:
   (a) a light source for emitting prescribed light;
   (b) a photosensitive material on which an electrostatic latent image is formed by the light from the light source,
   (c) a memory for storing density control information, wherein said density control information comprises data regarding the relationship between a potential on said electrostatic latent image and a light intensity of said light source, and data regarding the relationship between said potential on said electrostatic latent image and an image density of a desired printed image, and
   (d) a light intensity controller for controlling the light intensity of the light source according to the information in the memory.

2. An electrophotographic printing apparatus according to claim 1, further comprising:
   a control panel whereby said image density of a desired printed image can be input manually, and
   a computer information receiver capable of receiving said image density of a desired printed image from one or more of a plurality of computers.

3. The electrophotographic printing apparatus as set forth in claim 2, wherein said light intensity controller contains said memory therein.

4. The electrophotographic printing apparatus as set forth in claim 2, wherein the light source is a semiconductor laser.

5. The electrophotographic printing apparatus as set forth in claim 2, wherein the memory is a semiconductor memory.

6. The electrophotographic printing apparatus as set forth in claim 2, wherein the light intensity controller is a drive current control circuit for controlling drive current to the light source.

7. An electrophotographic printing apparatus according to claim 2, wherein said image density of a desired printed image depends on a difference between a potential of a portion of the image which is illuminated by said light source and a bias potential on a developing roller, wherein said developing roller is in contact with said photosensitive material.

8. An electrophotographic printing apparatus according to claim 2, wherein said image density of a desired printed image is generated by a printer driver.

9. An electrophotographic printing apparatus comprising:

a semiconductor laser emitting a laser beam;

a photosensitive material having an image carrier on a surface thereof whereby an electrostatic latent image is formed by directing said semiconductor laser onto said photosensitive material;

a developer having a developing roller and a first flexible regulating blade contacting the developing roller, whereby the developer forms a toner image on said photosensitive material;

a transfer roller located opposite said photosensitive material transferring said toner image to a print medium;

a control panel whereby desired image density information is generated with input from a user;

a computer data receiver receiving said desired image density information from a printer driver where said printer driver is located on at least one of a plurality of computers;

a memory for storing density control information, wherein said density control information comprises data regarding the relationship between a potential on said electrostatic latent image and a light intensity of said semiconductor laser, and data regarding the relationship between said potential on said electrostatic latent image and said desired image density information; and a controller varying an amount of light emitted from said semiconductor laser based on said density control information.

* * * * *